(12) United States Patent
Dalvi et al.

(10) Patent No.: US 11,416,611 B2
(45) Date of Patent: Aug. 16, 2022

(54) COUNTERING MALWARE DETECTION EVASION TECHNIQUES

(71) Applicant: VMWARE, INC., Palo Alto, CA (US)

(72) Inventors: Tanmay Ajit Dalvi, Pune (IN); Vaibhav Diwakar Kulkarni, Pune (IN); Anand Jaysingh Bhalerao, Pune (IN)

(73) Assignee: VMWARE, INC., Palo Alto, CA (US)

( * ) Notice: Subject to any disclaimer, the term of this patent is extended or adjusted under 35 U.S.C. 154(b) by 101 days.

(21) Appl. No.: 16/788,322

(22) Filed: Feb. 12, 2020

(65) Prior Publication Data

US 2021/0173929 A1 Jun. 10, 2021

(30) Foreign Application Priority Data

Dec. 5, 2019 (IN) .............................. 201941050160

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/56* | (2013.01) |
| *G06F 21/54* | (2013.01) |
| *G06F 21/57* | (2013.01) |

(52) U.S. Cl.
CPC ............ *G06F 21/564* (2013.01); *G06F 21/54* (2013.01); *G06F 21/566* (2013.01); *G06F 21/577* (2013.01)

(58) Field of Classification Search
CPC ...... G06F 21/564; G06F 21/54; G06F 21/577; G06F 21/566
See application file for complete search history.

(56) References Cited

U.S. PATENT DOCUMENTS

| | | | |
|---|---|---|---|
| 10,963,565 B1* | 3/2021 | Xu | G06F 21/562 |
| 2006/0021029 A1* | 1/2006 | Brickell | G06F 21/51 |
| | | | 726/22 |
| 2015/0339475 A1* | 11/2015 | Feroz | G06F 21/53 |
| | | | 726/23 |
| 2016/0285897 A1* | 9/2016 | Gantman | H04L 63/145 |
| 2018/0046799 A1* | 2/2018 | Kohavi | G06F 21/56 |
| 2019/0121959 A1* | 4/2019 | Woodworth, Jr. | G06F 21/563 |
| 2019/0364047 A1* | 11/2019 | Awate | H04L 63/0236 |
| 2020/0210571 A1* | 7/2020 | Vlaznev | G06F 21/561 |
| 2020/0210591 A1* | 7/2020 | Monastyrsky | G06F 9/45558 |

* cited by examiner

*Primary Examiner* — Trong H Nguyen

(57) ABSTRACT

An application downloaded from the network onto a target (production) machine can be validated in a sandbox environment. An execution report can be generated during the validation. When the validated application is executed on the target machine, operations performed by the application are limited based on the execution report.

19 Claims, 10 Drawing Sheets

| File Path | Access | Options | Content overwritten | Completion | Count | Source Address | Symbol |
|---|---|---|---|---|---|---|---|
| NA | read attributes and synchronize | non directory file | true | success or wait | 1 | 40819A | InternetOpenUrlA |
| C:\Windows\System32\en-us\wship6.dll.mui | read attributes and synchronize and generic read | no options | false | success or wait | 1 | 40819A | InternetOpenUrlA |
| C:\Windows\System32\en-us\wshtcpip.dll.mui | read attributes and synchronize and generic read | no options | false | success or wait | 1 | 40819A | InternetOpenUrlA |
| C:\Windows\System32\wshqos.dll | read attributes and synchronize and generic read | synchronous io non alert and non directory file | false | success or wait | 4 | 40819A | InternetOpenUrlA |
| C:\Windows\System32\en-us\wshqos.dll.mui | read attributes and synchronize and generic read | no options | false | success or wait | 4 | 40819A | InternetOpenUrlA |

FIG. 7A

| Source Port | Dest Port | Source IP | Dest IP |
|---|---|---|---|
| 53278 | 53 | 192.168.1.12 | 8.8.8.8 |
| 53 | 53278 | 8.8.8.8 | 192.168.1.12 |
| 49190 | 587 | 192.168.1.12 | 40.100.136.18 |
| 49190 | 587 | 192.168.1.12 | 40.100.136.18 |
| 49190 | 587 | 192.168.1.12 | 40.100.136.18 |
| 64052 | 53 | 192.168.1.12 | 8.8.8.8 |
| 53 | 64052 | 8.8.8.8 | 192.168.1.12 |
| 49191 | 587 | 192.168.1.12 | 40.100.136.18 |
| 587 | 49191 | 40.100.136.18 | 192.168.1.12 |
| 49191 | 587 | 192.168.1.12 | 40.100.136.18 |
| 49191 | 587 | 192.168.1.12 | 40.100.136.18 |
| 587 | 49191 | 40.100.136.18 | 192.168.1.12 |
| 587 | 49191 | 40.100.136.18 | 192.168.1.12 |
| 49191 | 587 | 192.168.1.12 | 40.100.136.18 |
| 49191 | 587 | 192.168.1.12 | 40.100.136.18 |

FIG. 7B

| Key Path | Source Address |
|---|---|
| HKEY_LOCAL_MACHINE\System\CurrentControlSet\Control\Session Manager | 774334E8 |
| HKEY_LOCAL_MACHINE\System\CurrentControlSet\Control\Terminal Server | 774334E8 |
| HKEY_LOCAL_MACHINE\System\CurrentControlSet\Control\SafeBoot\Option | 774334E8 |
| HKEY_LOCAL_MACHINE\System\CurrentControlSet\Control\Srp\GP\DLL | 774334E8 |
| HKEY_LOCAL_MACHINE\Software\Policies\Microsoft\Windows\Safer\CodeIdentifiers | 774334E8 |
| HKEY_USERS\Software\Policies\Microsoft\Windows\Safer\CodeIdentifiers | 774334E8 |
| HKEY_LOCAL_MACHINE\System\CurrentControlSet\Control\Nls\Sorting\Versions | 774334E8 |
| HKEY_LOCAL_MACHINE | 774334E8 |
| HKEY_LOCAL_MACHINE\System\CurrentControlSet\Control\Session Manager | 774334E8 |
| HKEY_LOCAL_MACHINE\System\CurrentControlSet\Control\Error Message Instrument\ | 774334E8 |
| HKEY_LOCAL_MACHINE\Software\Microsoft\Windows NT\CurrentVersion\GRE_Initialize | 774334E8 |
| HKEY_USERS\S-1-5-21-312802014-2796603565-3511680526-1004 | 774334E8 |
| HKEY_USERS\Control Panel\Desktop\MuiCached\MachineLanguageConfiguration | 774334E8 |
| HKEY_LOCAL_MACHINE\Software\Policies\Microsoft\MUI\Settings | 774334E8 |
| HKEY_USERS\Software\Policies\Microsoft\Control Panel\Desktop | 774334E8 |
| HKEY_USERS\Control Panel\Desktop\LanguageConfiguration | 774334E8 |
| HKEY_USERS\Control Panel\Desktop | 774334E8 |
| HKEY_USERS\Control Panel\Desktop\MuiCached | 774334E8 |

FIG. 7c

COUNTERING MALWARE DETECTION EVASION TECHNIQUES

RELATED APPLICATIONS

Benefit is claimed under 35 U.S.C. 119(a)-(d) to Foreign Application Serial No. 201941050460 filed in India entitled "COUNTERING MALWARE DETECTION EVASION TECHNIQUES" on Dec. 5, 2019, by VMWARE, Inc., which is herein incorporated in its entirety by reference for all purposes.

BACKGROUND

An application downloaded from the network or internet can be executed in a sandboxed environment to observe its behavior before allowing it to be executed on the endpoint. The endpoint is the computer system where the application was downloaded, and can be a virtual machine running on a hypervisor or a host operating system, or an operating system running directly on physical hardware such as a desktop or a laptop computer, or a container application running on bare-metal or on a virtual machine or in a hypervisor.

An agent can be installed on the endpoint to classify an application downloaded from the network as suspicious and ask for a sandbox to validate. If the sandbox returns the verdict that the application is benign, it will be allowed to execute on the endpoint. If the application displays malicious behavior, it can be quarantined or removed from the endpoint.

However, some malicious applications can detect that they are running on a sandbox and will disguise their behavior as a benign application. Once removed from quarantine on the endpoint, the malware can display its true behavior and cause problems with the endpoint itself or the infrastructure.

There are many ways for malware to detect that they are running on a sandbox, and malware authors continue to find different indicators that can be used to detect a sandbox. It is impractical to predict or disguise all the indicators that malware can use, and as a consequence some malware can be incorrected treated as benign by sandbox vendors and allowed to execute on the endpoint.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 7A, 7B, 7C show examples of information comprising an execution report in accordance with the present disclosure.

DETAILED DESCRIPTION

Agents executing on a target computer can restrict downloaded malware to benign behavior by restricting its activity, such as file, registry, and network access footprint, to what was reported when executing on the sandbox. By doing this, the malware is restricted to its benign behavior and is prevented from conducting malicious operations despite having been validated by the sandbox. Malware that behaves on the sandbox cannot later change its behavior to include malicious acts on the target machine. For example, suppose the malware on the sandbox accesses a DNS server address and the DNS query and DNS entry are reported as benign, the sandbox might classify the application as benign. The malware executing on the target computer may attempt to run a port scan and report to a third-party system that is controlled by the malware authors/hackers. The target computer can reject all connections, other than to the DNS server reported by the sandbox. Once the target computer detects that the application is requesting network connections other than those reported by the sandbox, it can (a) ask the user whether to allow this connection and report that this is a suspicious behavior, then accept or reject the connection based on the user input, (b) reject the connection outright, (c) terminate the process and quarantine it and report the same by alerting the infrastructure administrator, and so on.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
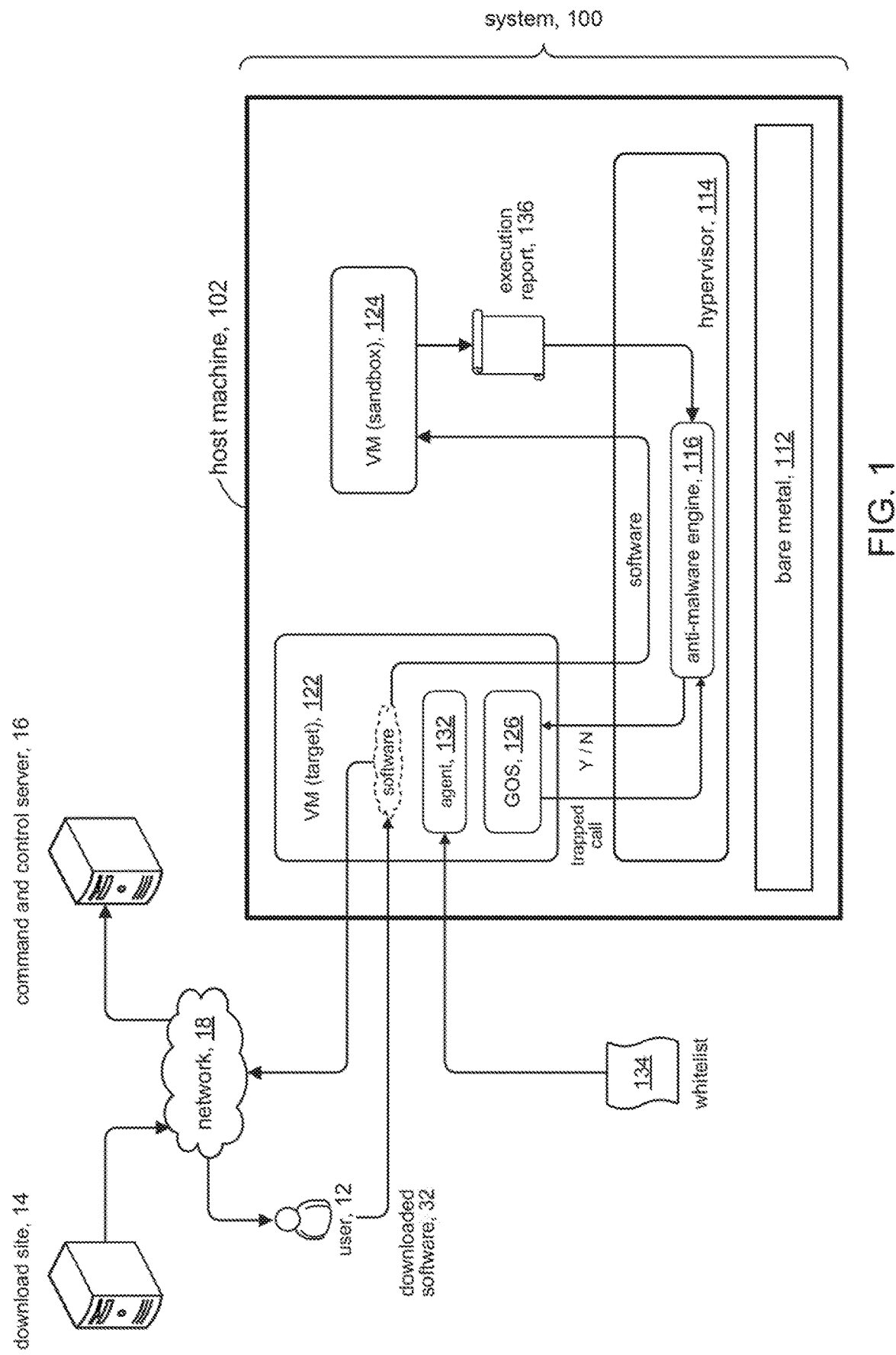
FIG. 1 depicts an illustrative system in accordance with some embodiments of the present disclosure.

FIG. 1 illustrates a system in accordance with the present disclosure to counteract the effects of techniques for evading the detection of malware. In some embodiments, for example, system 100 can include a host machine 102 that supports a virtualization environment. Software (executable program code) 32 can be downloaded onto system 100, for example by user 12, from download site 14. The downloaded software can be malware or benign. The term "malware" generally refers to any (malicious) software that is designed to disrupt, damage, or gain unauthorized access to a computer system. For example, malicious so ware may attempt to connect to a command and control server 16. Such servers can be used to send commands to a system that is compromised by malware and receive stolen data from a target network, or otherwise compromise operation of the attacked system. In the context of the present disclosure, "malware" will be understood to refer to any software that is deemed undesirable as determined by a system administrator, by enterprise policies, and so on.

Host 102 can include bare metal components 112 such as a processor, memory, disk storage and the like. A hypervisor 114 can execute on the bare metal 112 to support the deployment and instantiation of virtual machines (VMs). VM 122, for instance, can represent a target VM onto which software 32 can be downloaded for subsequent execution. In some instances, user 12 may log onto the VM and download software 32. In other instances, user 12 may remotely download software 32 onto VM 122. In some embodiments, VM 122 can include a download agent 132 to handle the process of downloading executable program code from remote sites.

System 100 can include whitelist 134. When software 32 is downloaded to target VM 122, it is not known whether the software is malicious or not. In some embodiments, the download agent 132 can compare an attribute of the downloaded software against a list to determine whether the software is malicious or not. For instance, the list can be whitelist 134 that download agent 132 can use to determine if the software is benign. Whitelist 134 can include criteria such as the name of the executable, a digital signature of the program being executed, a hash of the binary code, the location on the computer's file system where the executable resides, and so on. Although not shown, a blacklist can be used to identify known malicious software. If the downloaded software cannot be determined to be benign or malicious, the download agent 132 can submit the software to a sandbox for validation.

Hypervisor 114 can instantiate VM 124 as a sandbox machine. A sandboxed environment can be a virtual machine (FIG. 1) or a physical computer (FIGS. 2, 3) that has appropriate isolation from the rest of the infrastructure so that when malware is detonated on the sandbox computer, it cannot affect the rest of the network or other virtual machines or physical computers in the environment. For discussion purposes we will suppose that the sandbox is running on VM 124 with the understanding that in other embodiments, the sandbox can be a VM running on a hypervisor its a different host machine. The sandbox can be running on the cloud, and so on.

Download agent 132 executing on target VM 122 can communicate with sandbox VM 124 via the hypervisor 114. In accordance with the present disclosure, sandbox VM 124 can receive the downloaded software from target VM 122 and execute the software in a safe and controlled environment (sandbox environment) provided by the sandbox VM. The sandbox environment allows downloaded software that turns out to be malware to exhibit all its bad behavior with no impact on the target VM. When any malicious behavior is detected, sandbox VM 124 can signal that the downloaded software is malware so that appropriate action can be taken, such as having the malware quarantined, deleted, or otherwise processed accordingly. Malicious behavior can be detected, for example, by monitoring file access activity, changes made to the system configuration (e.g., the Registry in a Microsoft® Windows® OS), accessing known bad web sites or Internet addresses, and so on.

However, the malware may be able to detect that it is executing in a sandbox environment. For example, a malware can detect whether it is running in a virtualized environment by checking for presence of certain support tools such as VMware® Tools or Open VM™ Tools. The malware can then check the allocated CPU and RAM for the virtual machine, which could be one CPU and 2 GB or less of memory, which is typical for a security research environment or sandbox. It can also detect whether there is a user logged in or whether there is user action—such as cursor movement—during the execution. For instance, the ransomware Locky is said to be looking for run32dll.exe utility on a Microsoft® Windows™ OS, which is typically absent from the sandbox environment. The malware Gozi does not execute if the sandbox locale was Russia or China. Some others could do the exact opposite.

In response to determining that it is executing on a sandbox machine, the malware may restrict its operations to exhibit benign behavior only, thus fooling the sandbox machine into incorrectly concluding that the malware is benign. In accordance with the present disclosure, sandbox VM 124 can monitor operations performed by the downloaded software during its execution on the sandbox VM, and generate a corresponding execution report 136 that is associated with the software. This aspect of the present disclosure is discussed further below.

Hypervisor 114 can include anti-malware engine 116. In accordance with the present disclosure, when downloaded software 32 executes on target VM 122, guest operating system (guest OS) 126 executing on the target VM can trap operations attempted by the software and provide the trapped operations to the anti-malware engine via hypervisor 114. Using execution report 136, anti-malware engine 116 can assess the trapped operation and issue a Yes/No signal (or other suitable indicator) to target VM 122, allowing the target VM to take appropriate action. If a positive indication is provided, operation can be deemed to be benign and target VM 122 can execute the trapped operation. Otherwise the operation can be deemed to be malicious, and the target VM can take evasive action such as confirming with a user of the software whether to proceed with the operation associated with the trapped system call, deny the trapped operation outright, terminate execution of the software and log the event, and so on. Since hypervisor 114 isolates sandbox VM 124, anti-malware engine 116, and execution report 136 (collectively, the malware countermeasures) from target VM 122, these countermeasures are not visible to, and thus safe against, attacks that might be launched from the target VM. The isolation further ensures the integrity of the countermeasures from attacks directed against target VM 122 or guest OS 126.

In accordance with the present disclosure, execution report 136 limits the operations that downloaded software 32 can perform to those operations that were monitored on sandbox server 124. Thus, if downloaded software 32 is malicious and was able to fool sandbox VM 124 into concluding that it is benign by not performing malicious actions on the sandbox VM, execution report 136 serves to deny attempts by the software to perform those malicious actions on target VM 122. This aspect of the present disclosure is discussed in more detail below.

Figure 2:
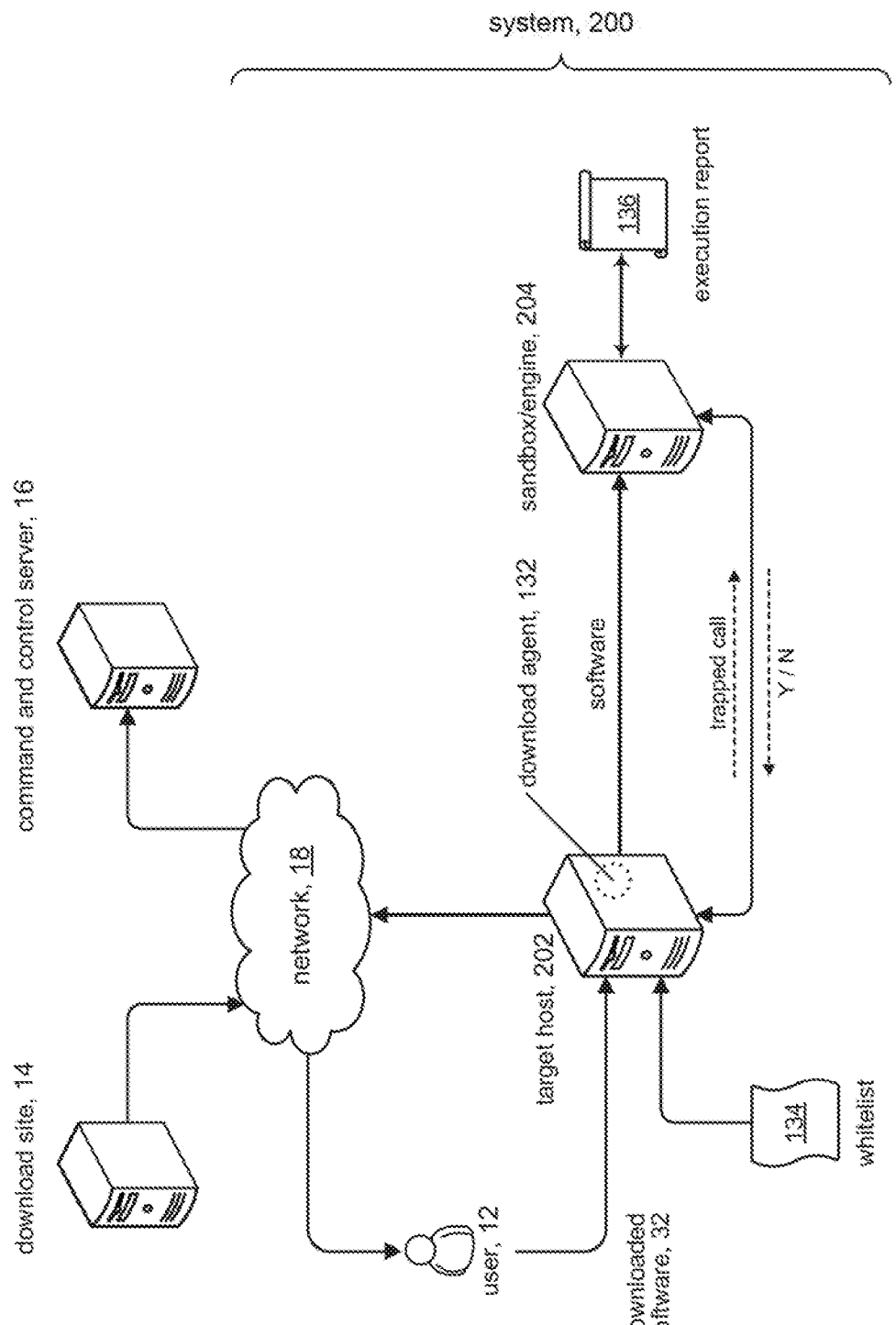
FIG. 2 depicts an illustrative system in accordance with other embodiments of the present disclosure.

FIG. 2 illustrates another embodiment of a system in accordance with the present disclosure to counteract the effects of techniques for evading the detection of malware. Elements in FIG. 2 that are common to FIG. 1 are represented by the same reference numerals. System 200 comprises bare metal target machine 202 on which software 32 is downloaded and installed for execution. Host machine 204 is separate from target host 202 and can operate as a sandbox server to provide a safe sandbox environment to execute the downloaded software in. The software can be sent by download agent 132 to host machine 204 based, for example, on whether or not the downloaded software appears in whitelist 134. In some embodiments, host machine 204 can also operate as an anti-malware engine. System calls trapped by target host 202 during execution of the downloaded software can be sent to host machine 204 to assess the system call using execution report 136 and to issue a Yes/No signal. Security measures can be provided on host machine 204 and the communication channel between host machines 202 and 204 to secure against tampering and ensure the integrity of the sandbox and anti-malware engine services provided by host machine 204, and the integrity of execution report 136 stored on the host machine.

Figure 3:
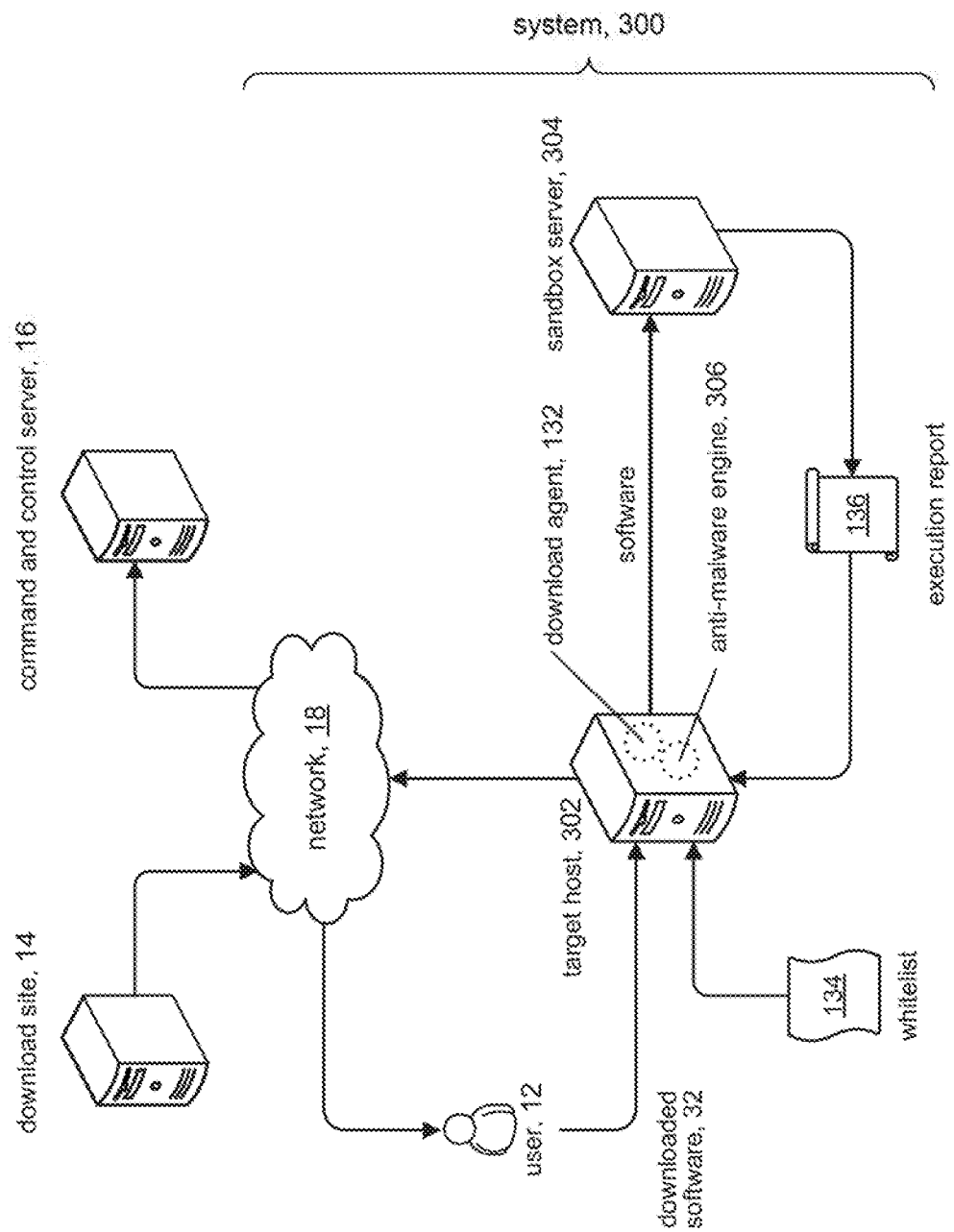
FIG. 3 depicts an illustrative system in accordance with still other embodiments of the present disclosure.

FIG. 3 illustrates still another embodiment of a system in accordance with the present disclosure to counteract the effects of techniques for evading the detection of malware. Elements in FIG. 3 that are common to FIG. 1 and FIG. 2 are represented by the same reference numerals. System 300 comprises bare metal target machine 302 and sandbox server 304. As depicted in FIG. 3, in some embodiments, anti-malware engine 306 can execute on target machine 302. System calls trapped by the OS on target machine 302 can be assessed by anti-malware engine 306 using execution report 136 generated by sandbox server 304. It will be appreciated that since anti-malware engine 306 is executing on the target machine itself, suitable security measures may be required on the target machine to reduce the risk of attacks against the anti-malware engine and the execution report.

Figure 4:
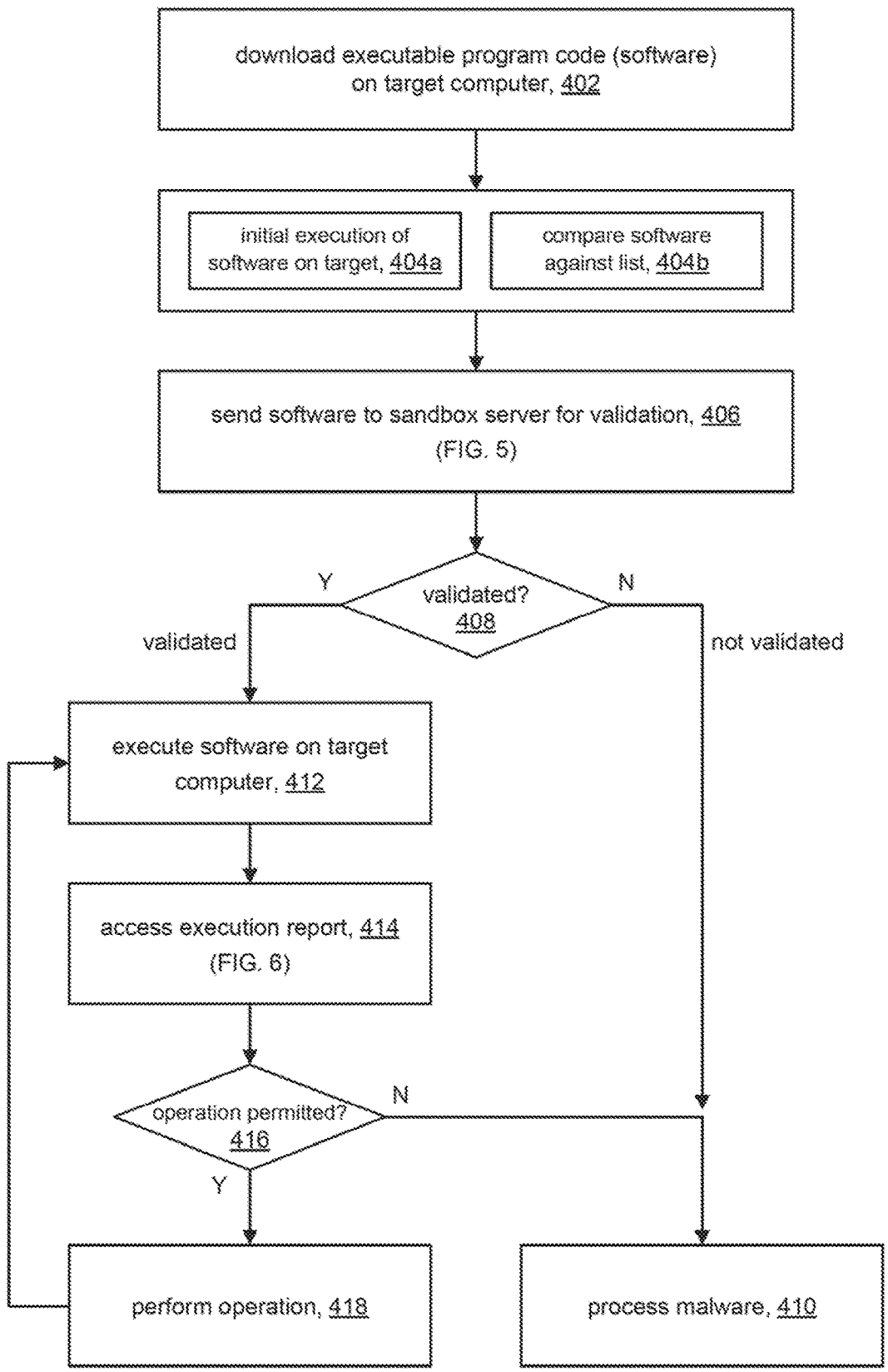
FIG. 4 shows operations in a target computer in accordance with the present disclosure.

Referring to FIG. 4, the discussion will now turn to a high level description of processing in the target computer (e.g., VM 122 in FIG. 1, host 202 in FIG. 2) for processing countering malware detection evasion tactics in accordance with the present disclosure. In some embodiments, for example, the target computer can include computer executable program code, which when executed by a processor (e.g., 802, FIG. 8), can cause the target computer to perform processing in accordance with FIG. 4. The actions depicted in the figure are not necessarily performed in the order shown.

At 402, the target computer can download software from the network (e.g., network 18). The downloaded software, for example, can be malware that a user unknowingly (or knowingly) downloaded. In some embodiments, executable files can downloaded using a download agent (e.g., download agent 132).

At 404a, and 404b, the target computer can determine to execute the downloaded software in a sandbox environment. In some embodiments, for example, when the user attempts to execute the downloaded software for the first time (at 404a), the target computer can redirect the downloaded software for execution in a sandbox environment. In other embodiments, a list (e.g., whitelist 134) can be used (at 404b) to determine whether the downloaded software is malicious or not. For example, a blacklist can be used to identify known malicious code, and any identified malicious code can be immediately processed (e.g., quarantined, deleted, subjected to further analysis, and so on). A whitelist can be used to identify known benign code. If the downloaded software cannot be determined to be either benign or malicious, the target computer can direct the downloaded software for execution in a sandbox environment, for example via a download agent executing on the target computer.

At 406, the target computer can send the downloaded software to a sandbox server for validation. Consider the configuration in FIG. 1, for instance. The target computer can be VM 122 and the sandbox server can be VM 124. Download agent 132 executing on target VM 122 can provide the downloaded software to sandbox VM 124 via hypervisor 114. The sandbox server can provide a safe execution environment in which to execute and validate the downloaded software. This aspect of the present disclosure is discussed in more detail below.

At 408, the target computer can act on the downloaded software based on the whether the software was validated by the sandbox server or not. If the sandbox server signals an indication that the downloaded software is malware (not validated), then processing can continue at 410. If the sandbox server signals an indication that the software is benign (validated), then processing can continue at 412. As will be discussed in more detail below, in accordance with the present disclosure, when the sandbox server validates the downloaded software, the sandbox server can generate an execution report (e.g., 132, FIG. 1) that is associated with the software and which contains information relating to operations performed by the software while executing in the sandbox environment of the sandbox server.

At 410, in response to a determination (at 408) that the downloaded software is not validated, the target computer can process the software as potential malware. In some embodiments, for example, the user can be informed of possible suspicious activity and prompted to confirm whether or not to proceed with the operation. In other embodiments, an alert can be thrown to a system administrator, who can then decide what action to take. The target computer can simply terminate execution of the downloaded software and log an error. The downloaded software can be deleted from the target computer. The software can be quarantined for further analysis, and so on. Processing of the downloaded software can be deemed complete.

At 412, in response to a determination (at 408) that the downloaded software is validated, the target computer can allow the software to be executed. For instance, the downloaded software can execute on the target computer in response to the user launching the software.

At 414, the target computer can access the execution report associated with the downloaded software during execution of the software on the target computer to limit or otherwise restrict operations that can be performed by the software. In some embodiments, for example, the OS in the target computer can access the execution report by trapping system calls corresponding to an operation made during execution of the downloaded software and assessing the trapped system calls against the execution report using an anti-malware engine. In some embodiments, for example, the target computer can be a VM (e.g., target VM 122, FIG. 1) executing on a host machine. The anti-malware engine 116 can be a component in hypervisor 114. Handles in the guest OS executing on the target VM can be provided to send trapped system calls to the anti-malware engine. The anti-malware engine can access the execution report to assess the system call and provide a positive or negative assessment (e.g., Yes/No signal) to the target computer. This aspect of the present disclosure is described in more detail below.

At 416, the target computer can determine whether or not to perform the operation based on the assessment made by the anti-malware engine at 414. In response to an a positive assessment from the anti-malware engine, the target computer can continue to 418 to perform the operation. In response to a negative assessment from the anti-malware engine, the target computer can treat the downloaded software as malware and proceed to 410. This aspect of the present disclosure is discussed further below.

Figure 5:
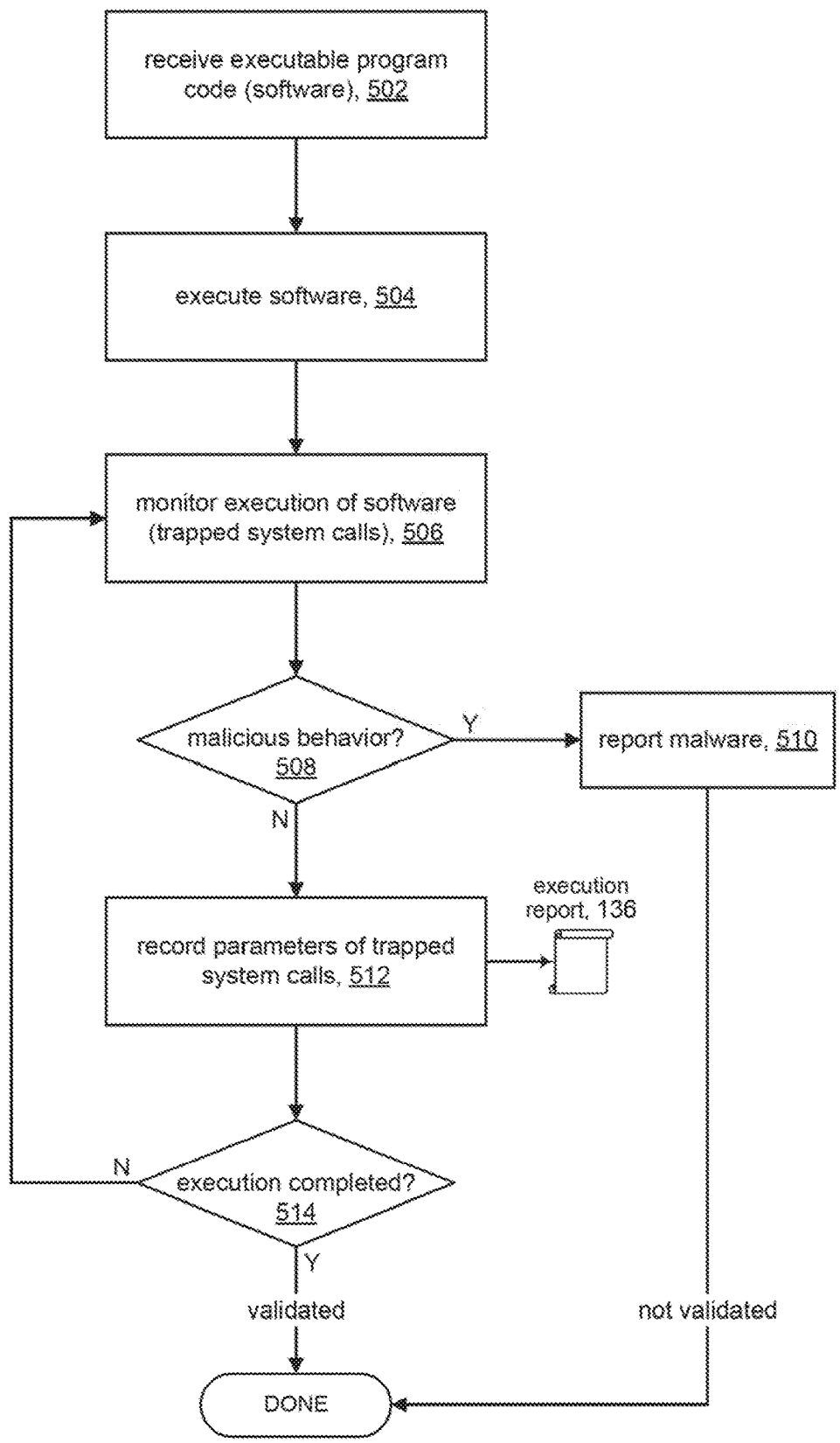
FIG. 5 shows operations in a sandbox computer in accordance with the present disclosure.

Referring to FIG. 5, the discussion will now turn to a high level description of processing in a sandbox server to generate an execution report (e.g., 136, FIG. 1) in accordance with the present disclosure. In some embodiments, for example, the sandbox server can include computer executable program code, which when executed by a processor (e.g., 802, FIG. 8), can cause the sandbox server to perform processing in accordance with FIG. 6. The actions depicted in the figure are not necessarily performed in the order shown.

At 502, the sandbox server can receive the downloaded software for execution. In some embodiments, for example in a virtualization system, the sandbox server can be a VM executing on a host. A target VM can provide the downloaded software to the sandbox VM via the underlying hypervisor executing on the host.

At 504, the sandbox server can launch the downloaded software.

At 506, the sandbox server can monitor execution of the downloaded software. For example, operations including file I/O, network access, and access to system configuration settings can be monitored. An I/O stack, for instance, can comprise device drivers that make system calls (services) to the OS, for example, to open files, read and write files, delete tiles, and so on. Likewise, a protocol stack, includes a set of services that allow processes to communicate over a network, and can include system calls to create TCP/IP sockets, open connections to remote devices, send and receive data with the remote devices, and so on. System configuration settings (e.g., the Registry in the Microsoft® Windows OS) can use system calls to create, read, and modify system and user configuration settings. Still other operations can be monitored. These system calls can be "trapped" in the sense that code (monitoring code) can be added to the system calls to monitor and/or record the parameters that were provided to the system calls. For instance, a file open system call may include the pathname of the file to be opened. The system call to open a connection with a device over the network can include parameters such as the IP and MAC addresses, ports, and so on. These parameters and other information can be stored in the execution report as information that relate to operations performed by the downloaded software.

At 508, the sandbox server can look for known malicious behavior in a trapped system call. In some embodiments, for example, malicious behavior can be detected based on the parameters provided to the system call. The monitoring code in a trapped system call can match the parameters of the system call to specific file names, specific IP addresses, and so on. For example, if an attempt is made to modify "/etc/passwd" (the password tile on a Unix-based system), that operation can be deemed to constitute malicious behavior. If an attempt is made to open a socket to a command and control server, that operation can be deemed malicious. If an attempt is made to change the privilege level of the downloaded software to a privileged user (e.g., to 'root' user), that operation can be deemed malicious, and so on. If the monitoring code detects malicious behavior, the sandbox server can terminate execution of the downloaded software and proceed to 510. If no malicious behavior is detected in the system call, then processing can continue at 512.

At 510, in response to a determination (at 508) that malicious behavior was detected, the sandbox server can report that the downloaded software is malware, for example, by logging a 'not validated' event in a log. The sandbox server can signal an indication to the target computer that the software is not validated (see 408, FIG. 4). Processing in the sandbox server can be deemed complete.

At 512, in response to a determination (at 508) that malicious behavior was not detected, the sandbox server can record the parameters of the trapped system call(s) in an execution report that is associated with the downloaded software. In accordance with the present disclosure, the sandbox server can avoid a false positive determination that the downloaded software is benign by recording the parameters of trapped system calls in the associated execution report even though the operations may be benign. This aspect of the present disclosure is discussed further below.

At 514, the sandbox server can continue to monitor the downloaded software ('N' branch) until (1) the software terminates at 508 due to the detection of malicious behavior or (2) the software itself exits ('Y' branch). If the process reaches the 'Y' branch at decision point 514, the downloaded software can be deemed valid since malicious behavior had not been detected. The sandbox server can signal an indication to the target computer that the downloaded software is deemed to be validated (see 408, FIG. 4).

It is noted that a false positive determination of validity can be made for downloaded software that is in fact malware. For instance, if the malware can detect that it is executing on a sandbox, the malware can hide its malicious behavior by not executing the malicious code and executing only benign and otherwise innocuous code. For example, the malware may rely on differences in hardware configuration number (e.g., number of CPU cores) in order to spot a sandbox. The malware can detect the lack of user input in a sandbox; in a real machine, user input, such as keyboard or mouse activity, will be a frequent occurrence. By hiding its bad behavior, the malware effectively evades the malware detection efforts of the sandbox thus fooling the sandbox into erroneously concluding that the malware is benign.

However, as described at 512 in FIG. 5, in accordance with the present disclosure, the sandbox can generate an execution report that records information relating to operations performed by the malware. As shown in FIG. 4, when the malware executes on the target computer, operations performed by the malware can be limited to those that are in the associated execution report. If the malware executes an operation (e.g., malicious code) that is not listed in its associated execution report, the target computer can trap the attempted operation and take appropriate action (see 410, FIG. 4). Thus, even though the malware may fool the sandbox into concluding that the malware was benign by performing only benign operations, information relating to those benign operations are recorded in its associated execution report. The execution report therefore limits execution of the malware on the target computer to benign operations that the malware exposed to the sandbox.

Figure 6:
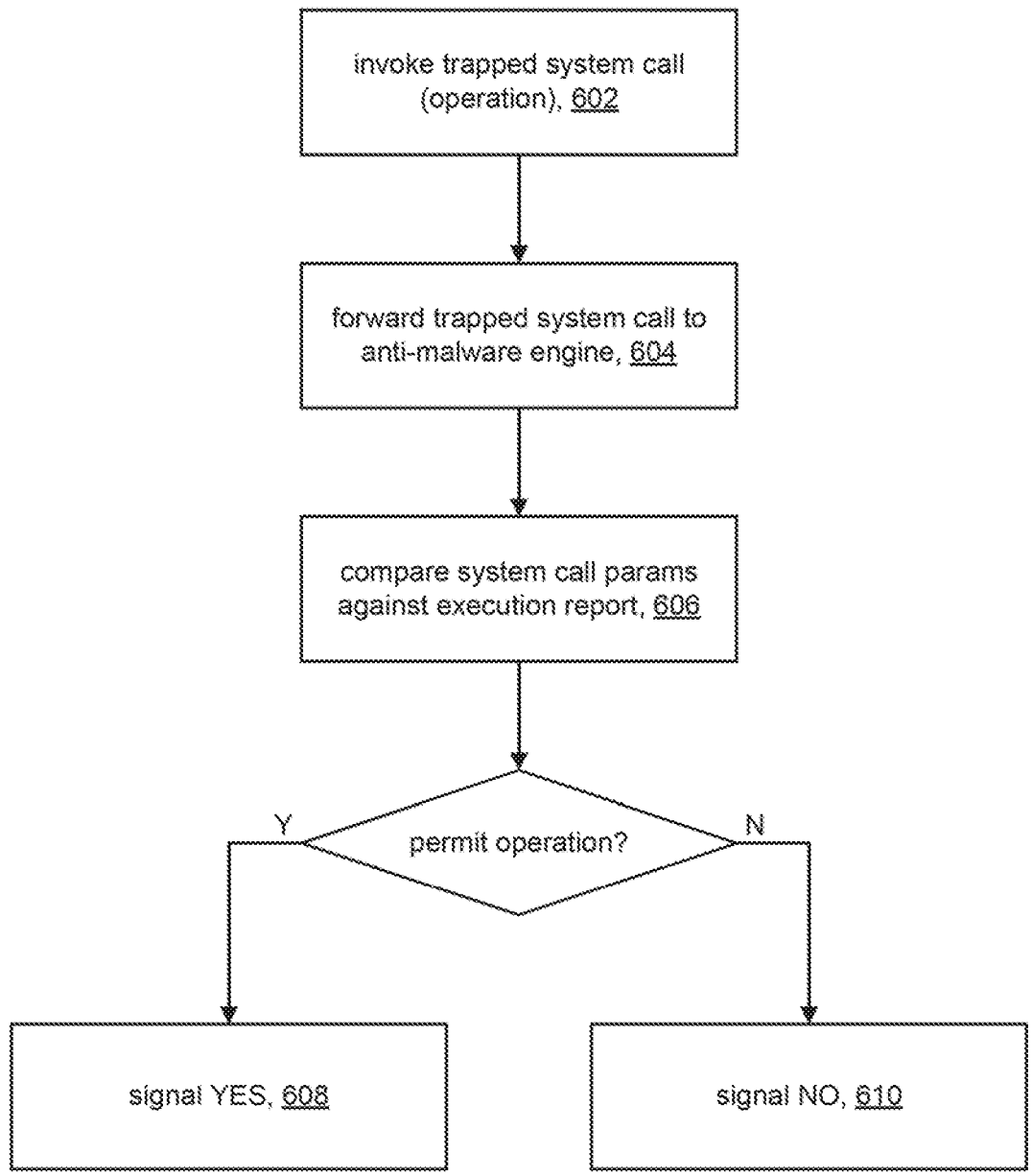
FIG. 6 shows using an execution report in a target computer in accordance with the present disclosure.

Referring to FIG. 6, the discussion will now turn to a high level description of using the execution report, in accordance with the present disclosure, to restrict operations performed by the associated software executing on a target computer. In some embodiments, for example, the target computer can include computer executable program code, which when executed by a processor e.g., 802, FIG. 8), can cause the target computer to perform processing in accordance with FIG. 6. The actions depicted in the figure are not necessarily performed in the order shown.

At 602, the target computer can invoke a system call when the downloaded software is executing on the target computer. For example, if the software opens a connection to a website, that operation can involve several system calls. File operations involve system calls, and so on.

At 604, the target computer can forward trapped system calls to an anti-malware engine. Some system calls can be "trapped" in the sense that code can be added to the system calls to direct or otherwise forward the system call to be assessed by an anti-malware engine. In FIG. 1, for instance, the target computer is a VM (target VM 122) running on top of a hypervisor. The anti-malware engine resides in hypervisor 114. A system call in the target VM's guest OS can invoke a call into hypervisor 114 in order to forward the system call to anti-malware engine 116. In FIG. 3, anti-malware engine 306 resides in the OS of the target host machine itself.

At 606, the anti-malware engine can compare parameters of the system call against information in the execution report associated with the software. If parameters in the system call match corresponding information contained in the execution report, then the operation was performed in the sandbox while the software was exhibiting benign behavior. Accordingly, the anti-malware engine can signal (at 608) a positive assessment (YES) to the target computer, allowing the target computer to perform the action.

If on the other hand, the parameters do not match information in the execution report, the anti-malware engine can signal (at 610) a negative assessment (NO) to the target computer. For example, suppose the software is in fact malware and is now exhibiting malicious behavior on the target computer that it had hidden from the sandbox. The execution report will have no information of the malicious operation and so the anti-malware engine will signal a negative assessment to alert the target computer, allowing the target computer to take appropriate action (see 410, FIG. 4).

FIGS. 7A, 7B, 7C are illustrative examples of information that can be provided in an execution report in accordance with the present disclosure. FIG. 7A illustrates an example of information in an execution report that relate to file operations that can be recorded by the sandbox, including a pathname of the file, access permissions, whether the operation overwrote the file contents, and so on. FIG. 7B illustrates an example of information in an execution report that relate to network access operations captured by the sandbox, including source and destination port identifiers and source and destination IP addresses. FIG. 7C illustrates an example of information in an execution report that relate to Registry key (system configuration) operations, including a key pathname and a source address that indicates the location from where the system call was made to open or edit the registry key.

In accordance with the present disclosure, the execution report limits the operations that can performed by the software when executing on the target computer. For example, if the software executing on the target computer performs a directory name server (DNS) query with the following parameters:

source *IP*=192.168.1.16,destination *IP*=8.8.8.8 the operation will be blocked because the parameters of the DNS query operation do not match any corresponding parameters in FIG. 7B. Likewise, an attempt on the target computer to modify the Registry key:

HKEY_USERS\Software\Microsoft\Windows\Current\Version\Internet Settings\Connections will be blocked because the above parameter in a registry-key modify operation would not match any parameters recorded in FIG. 7C.

Figure 8:
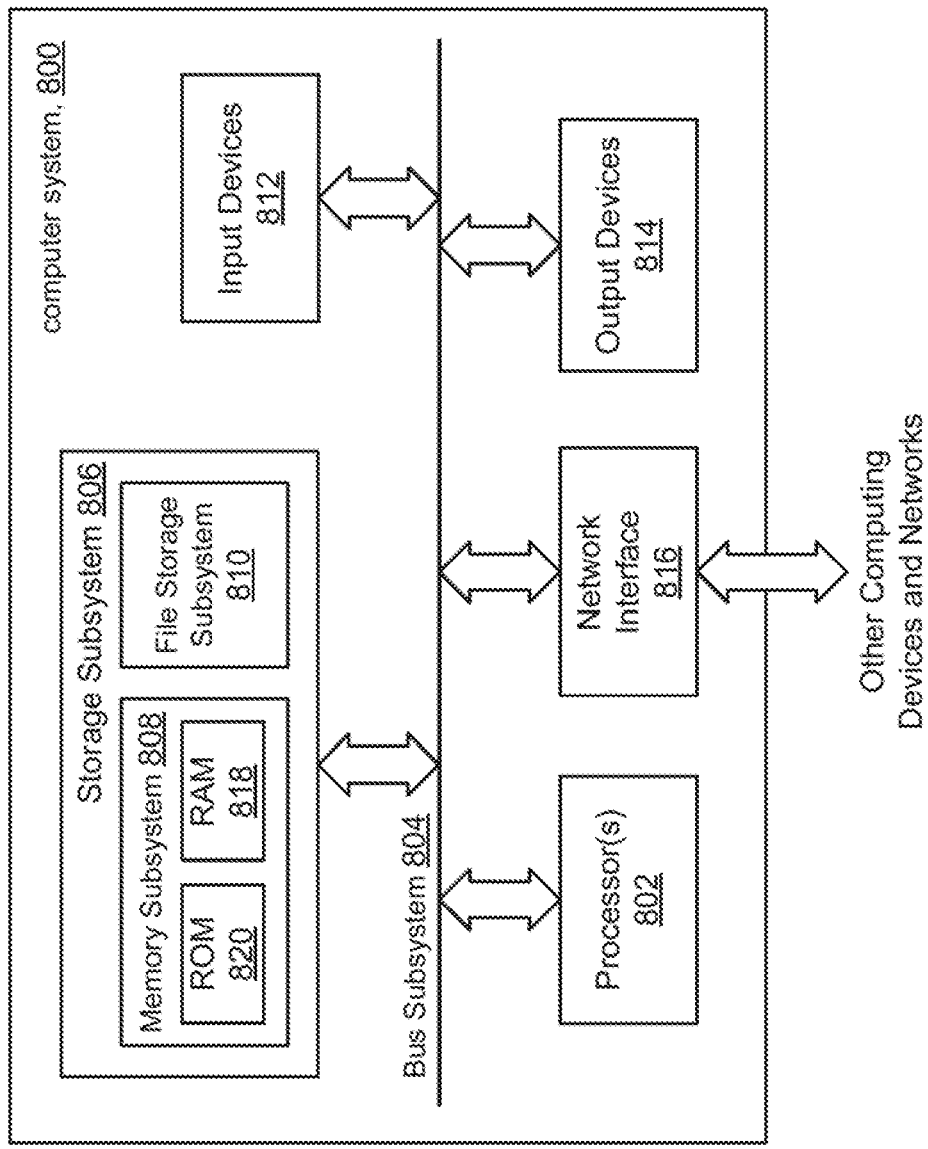
FIG. 8 shows an illustrative example of a computer that can be configured in accordance with the present disclosure.

FIG. 8 depicts a simplified block diagram of an example computer system 800 according to certain embodiments. Computer system 800 can be used to implement host machine 102 in FIG. 1 or target hosts 202 and 302 in FIGS. 2 and 3, respectively. Computer system 800 can be used to implement sandbox servers 204 and 304 in FIGS. 2 and 3, respectively. As shown in FIG. 8, computer system 800 includes one or more processors 802 that communicate with a number of peripheral devices via bus subsystem 804. These peripheral devices include storage subsystem 806 (comprising memory subsystem 808 and file storage subsystem 810), user interface input devices 812, user interface output devices 814, and network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Memory subsystem 806 includes memory subsystem 808 and file/disk storage subsystem 810 represent non-transitory computer-readable storage media that can store program code and/or data, which when executed by processor 802, can cause processor 802 to perform operations in accordance with embodiments of the present disclosure.

Memory subsystem 808 includes a number of memories including main random access memory (RAM) 818 for storage of instructions and data during program execution and read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fill within the scope of the disclosure(s). In general, structures and functionality presented as separate components in exemplary configurations may be implemented as a combined structure or component. Similarly, structures and functionality presented as a single component may be implemented as separate components.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   receiving, by a hypervisor of a computer, executable program code downloaded by a first virtual machine (VM) of the computer;
   providing, by the hypervisor, the executable program code to a second VM of the computer that is separate from the first VM, wherein the second VM executes the executable program code, monitors operations performed by the executable program code during its runtime, and provides to the hypervisor an execution report identifying the operations;
   in response to receiving the execution report from the second VM, allowing, by the hypervisor, the executable program code to be executed within the first VM;
   receiving, by the hypervisor from the first VM, information regarding a system call invoked by the executable program code;
   determining, by the hypervisor, whether the executable program code is allowed to execute the system call within the first VM based on the execution report received from the second VM; and
   providing, by the hypervisor to the first VM, a signal indicating an outcome of the determining.

2. The method of claim 1 wherein the hypervisor does not allow the executable program code to execute system calls within the first VM that pertain to operations not identified in the execution report.

3. The method of claim 1 wherein the operations include file-related operations, system configuration operations, and network access operations.

4. The method of claim 1 further comprising:
   determining whether the executable program code is in a list of known executable program code; and
   providing the executable program code to the second VM in response to determining that the executable program code is not in the list.

5. The method of claim 1 wherein the executable program code is provided to the second VM in response to an attempt to execute the executable program code within the first VM for a first time.

6. The method of claim 1 further comprising receiving an indication from the second VM that the second VM generated the execution report.

7. The method of claim 1 further comprising, upon determining that the executable program code is not allowed to execute the system call within the first VM based on the execution report:
   confirming with a user of the executable program code whether to proceed with the system call;
   denying execution of the system call; or
   terminating execution of the executable program code within the first VM.

8. A non-transitory computer-readable storage medium having stored thereon instructions executable by a processor of a computer, the instructions embodying a method comprising:
   receiving, by a hypervisor, executable program code downloaded by a first virtual machine (VM) of the computer;
   providing, by the hypervisor, the executable program code to a second VM of the computer that is separate from the first VM, wherein the second VM executes the executable program code, monitors operations performed by the executable program code during its runtime, and provides to the hypervisor an execution report identifying the operations;
   in response to receiving the execution report from the second VM, allowing, by the hypervisor, the executable program code to be executed within the first VM;
   receiving, by the hypervisor from the first VM, information regarding a system call invoked by the executable program code;
   determining, by the hypervisor, whether the executable program code is allowed to execute the system call within the first VM based on the execution report received from the second VM; and
   providing, by the hypervisor to the first VM, a signal indicating an outcome of the determining.

9. The non-transitory computer-readable storage medium of claim 8 wherein the hypervisor does not allow the executable program code to execute system calls within the first VM that pertain to operations not identified in the execution report.

10. The non-transitory computer-readable storage medium of claim 8 wherein the operations include file-related operations, system configuration operations, and network access operations.

11. The non-transitory computer-readable storage medium of claim 8 wherein the method further comprises:
   determining whether the executable program code is in a list of known executable program code; and
   providing the executable program code to the second VM in response to determining that the executable program code is not in the list.

12. The non-transitory computer-readable storage medium of claim 8 wherein the executable program code is provided to the second VM in response to an attempt to execute the executable program code within the first VM for a first time.

13. The non-transitory computer-readable storage medium of claim 8 wherein the method further comprises, upon determining that the executable program code is not allowed to execute the system call within the first VM based on the execution report:
   confirming with a user of the executable program code whether to proceed with the system call;
   denying execution of the system call; or
   terminating execution of the executable program code within the first VM.

14. A computer comprising:
   one or more computer processors running a hypervisor; and
   a non-transitory computer-readable storage medium comprising instructions that, when executed by the one or more computer processors, cause the hypervisor to:
   receive executable program code downloaded by a first virtual machine (VM) of the computer;
   provide the executable program code to a second VM of the computer that is separate from the first VM, wherein the second VM executes the executable program code, monitors operations performed by the executable program code during its runtime, and provides to the hypervisor an execution report identifying the operations;
   in response to receiving the execution report from the second VM, allow the executable program code to be executed within the first VM;
   receive, from the first VM, information regarding a system call invoked by the executable program code;
   determine whether the executable program code is allowed to execute the system call within the first VM based on the execution report received from the second VM; and
   provide, to the first VM, a signal indicating an outcome of the determining.

15. The computer of claim 14 wherein the hypervisor does not allow the executable program code to execute system calls within the first VM that pertain to operations not identified in the execution report.

16. The computer of claim 14 wherein the operations include file-related operations, system configuration operations, and network access operations.

17. The computer of claim 14, wherein the computer-readable storage medium further comprises instructions that cause the hypervisor to:
   determine whether the executable program code is in a list of known executable program code; and
   provide the executable program code to the second VM in response to determining that the executable program code is not in the list.

18. The computer of claim 14, wherein the computer-readable storage medium further comprises instructions that cause the hypervisor to receive an indication from the second VM that the second VM generated the execution report.

19. The computer of claim 14 wherein the instructions further cause the hypervisor to, upon determining that the executable program code is not allowed to execute the system call within the first VM based on the execution report:
   confirm with a user of the executable program code whether to proceed with the system call;
   deny execution of the system call; or
   terminate execution of the executable program code within the first VM.

* * * * *